US011551873B2

(12) United States Patent
Hattori et al.

(10) Patent No.: US 11,551,873 B2
(45) Date of Patent: Jan. 10, 2023

(54) METHOD OF PRODUCING A MULTI-LAYER CERAMIC ELECTRONIC COMPONENT

(71) Applicant: Taiyo Yuden Co., Ltd., Tokyo (JP)

(72) Inventors: Takayuki Hattori, Tokyo (JP); Yuto Yamato, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 314 days.

(21) Appl. No.: 16/414,365

(22) Filed: May 16, 2019

(65) Prior Publication Data

US 2019/0355521 A1 Nov. 21, 2019

(30) Foreign Application Priority Data

May 21, 2018 (JP) ............................ JP2018-097022

(51) Int. Cl.

| | |
|---|---|
| ***H01G 4/30*** | (2006.01) |
| ***H01G 4/10*** | (2006.01) |
| ***H01G 4/012*** | (2006.01) |
| ***H01G 4/12*** | (2006.01) |
| ***H01G 4/232*** | (2006.01) |

(52) U.S. Cl.

CPC ............... *H01G 4/30* (2013.01); *H01G 4/012* (2013.01); *H01G 4/10* (2013.01); *H01G 4/1227* (2013.01); *H01G 4/1236* (2013.01); *H01G 4/1245* (2013.01); *H01G 4/232* (2013.01)

(58) Field of Classification Search

CPC ........ H01G 4/012; H01G 4/10; H01G 4/1227; H01G 4/1236; H01G 4/1245; H01G 4/232; H01G 4/30

See application file for complete search history.

(56) References Cited

U.S. PATENT DOCUMENTS

| | | | | |
|---|---|---|---|---|
| 5,144,527 A * | 9/1992 | Amano | .................. | H01G 4/012 29/25.42 |
| 6,785,941 B2 * | 9/2004 | Nakamura | ............. | B32B 18/00 29/25.42 |
| 8,795,454 B2 * | 8/2014 | Matsui | .................. | H01G 13/00 156/89.12 |

(Continued)

FOREIGN PATENT DOCUMENTS

| | | |
|---|---|---|
| CN | 102683020 A | 9/2012 |
| CN | 106356189 A | 1/2017 |

(Continued)

OTHER PUBLICATIONS

Office Action dated Dec. 13, 2021 in Japanese Application No. 2018-097022.

(Continued)

*Primary Examiner* — Minh N Trinh

(74) *Attorney, Agent, or Firm* — Saliwanchik, Lloyd & Eisenschenk

(57) ABSTRACT

A method of producing a multi-layer ceramic electronic component includes: producing a multi-layer unit including ceramic layers that are laminated in a first direction, internal electrodes that are disposed between the ceramic layers, and a side surface that faces in a second direction orthogonal to the first direction, the internal electrodes being exposed on the side surface; sintering the multi-layer unit; and forming a side margin on the side surface of the sintered multi-layer unit.

6 Claims, 12 Drawing Sheets

START

Prepare ceramic sheet — S01

Laminate — S02

Cut — S03

Sinter — S04

Form side margin — S05

Form oxidized region — S06

Form external electrode — S07

END

(56) References Cited

U.S. PATENT DOCUMENTS

| | | | | |
|---|---|---|---|---|
| 10,629,381 | B2 * | 4/2020 | Park | H01G 4/1227 |
| 2012/0229949 | A1 * | 9/2012 | Kim | H01G 4/12 361/321.2 |
| 2012/0234462 | A1 | 9/2012 | Matsui et al. | |
| 2013/0340920 | A1 | 12/2013 | Matsui et al. | |
| 2014/0345779 | A1 | 11/2014 | Matsui et al. | |
| 2017/0018363 | A1 | 1/2017 | Tanaka et al. | |
| 2017/0301470 | A1 * | 10/2017 | Asai | H01G 4/232 |
| 2018/0061575 | A1 | 3/2018 | Mizuno | |
| 2018/0108482 | A1 | 4/2018 | Kogure et al. | |
| 2018/0240598 | A1 | 8/2018 | Tanaka et al. | |
| 2019/0096586 | A1 | 3/2019 | Tanaka et al. | |
| 2019/0103226 | A1 | 4/2019 | Tanaka et al. | |
| 2019/0189353 | A1 | 6/2019 | Tanaka et al. | |
| 2019/0189354 | A1 | 6/2019 | Tanaka et al. | |
| 2019/0189355 | A1 | 6/2019 | Tanaka et al. | |
| 2019/0189356 | A1 | 6/2019 | Tanaka et al. | |
| 2019/0279822 | A1 | 9/2019 | Mizuno | |
| 2019/0355521 | A1 * | 11/2019 | Hattori | H01G 4/10 |
| 2020/0020483 | A1 | 1/2020 | Tanaka et al. | |
| 2020/0111617 | A1 | 4/2020 | Mizuno | |
| 2020/0185154 | A1 | 6/2020 | Tanaka et al. | |
| 2020/0266000 | A1 | 8/2020 | Tanaka et al. | |
| 2020/0266001 | A1 | 8/2020 | Tanaka et al. | |
| 2021/0202182 | A1 | 7/2021 | Tanaka et al. | |

FOREIGN PATENT DOCUMENTS

| | | | |
|---|---|---|---|
| CN | 107799306 | A | 3/2018 |
| CN | 107958782 | A | 4/2018 |
| JP | 3-129812 | A | 6/1991 |
| JP | 7-122455 | A | 5/1995 |
| JP | 10-199749 | A | 7/1998 |
| JP | 2001-6964 | A | 1/2001 |
| JP | 2012-209539 | A | 10/2012 |
| JP | 2016-48803 | A | 4/2016 |
| JP | 2016-225603 | A | 12/2016 |
| JP | 2017-11172 | A | 1/2017 |
| JP | 2017-59820 | A | 3/2017 |

OTHER PUBLICATIONS

Office Action dated Sep. 3, 2021 in Chinese Application No. 201910422995.3.

Office Action dated May 6, 2022 in Chinese Application No. 201910422995.3.

* cited by examiner

103
Ly
Lx
X
Y
Z

102
Ly
Lx
113
113
X
Y
Z

101
Ly
Lx
112
112
112
X
Y
Z

METHOD OF PRODUCING A MULTI-LAYER CERAMIC ELECTRONIC COMPONENT

CROSS-REFERENCE TO RELATED APPLICATION

This application claims priority to Japanese Application No. 2018-097022, filed May 21, 2018; which is hereby incorporated by reference in its entirety.

BACKGROUND

The present disclosure relates to a method of producing a multi-layer ceramic electronic component including side margins provided in a later step.

Japanese Patent Application Laid-open No. 2001-6964 discloses a large multi-layer ceramic capacitor. In such a large multi-layer ceramic capacitor, the capacitance can be increased by enlarging an intersectional area of internal electrodes or increasing the number of laminated layers. Accordingly, the multi-layer ceramic capacitor can be used in place of an electrolytic capacitor, for example.

Further, Japanese Patent Application Laid-open No. 2012-209539 discloses a technique of providing, in a later step, side margins for ensuring insulation properties of the periphery of internal electrodes to a multi-layer unit including internal electrodes exposed on side surfaces thereof. This technique enables the side margins to be thinned, which makes it possible to relatively enlarge the intersectional area of the internal electrodes.

SUMMARY

In the technique of providing the side margins in a later step, as the size of the multi-layer ceramic capacitor becomes larger, a difference in shrinkage behavior between the multi-layer unit and the side margin at the time of sintering becomes larger. Accordingly, a short circuit of the internal electrodes is likely to occur due to the deformation of the internal electrodes, the deformation being caused by stress applied from the side margin to the side surface of the multi-layer unit.

In view of the circumstances as described above, it is desirable to provide a method of producing a multi-layer ceramic electronic component, which is capable of suppressing the occurrence of a short circuit of internal electrodes.

According to an embodiment of the present disclosure, there is provided a method of producing a multi-layer ceramic electronic component, the method including: producing a multi-layer unit including ceramic layers that are laminated in a first direction, internal electrodes that are disposed between the ceramic layers, and a side surface that faces in a second direction orthogonal to the first direction, the internal electrodes being exposed on the side surface; sintering the multi-layer unit; and forming a side margin on the side surface of the sintered multi-layer unit.

In this configuration, since the multi-layer unit is sintered before the side margin is formed, a short circuit due to deformation of the internal electrodes is less likely to occur at the time of sintering.

An oxidized region may be formed at an end portion in the second direction of each of the internal electrodes of the multi-layer unit on which the side margin is formed.

In this configuration, when the oxidized region is formed in the vicinity of the side surface of the multi-layer unit, a short circuit of the internal electrodes is much less likely to occur. Further, since the oxidized region is formed after the side margin is formed, the dimension of the oxidized region can be suitably controlled.

The oxidized region may have a dimension of 10 μm or more in the second direction.

In this configuration, the occurrence of a short circuit of the internal electrodes can be effectively suppressed.

The multi-layer ceramic electronic component may have a dimension of 0.8 mm or more in the first direction.

In the multi-layer ceramic electronic component, the number of lamination of the internal electrodes may be 500 layers or more.

In those configurations, a multi-layer ceramic electronic component with high performance is obtained.

The side margin may be formed by a dip method.

In this configuration, the occurrence of a short circuit of the internal electrodes can be more effectively suppressed.

It is possible to provide a method of producing a multi-layer ceramic electronic component, which is capable of suppressing the occurrence of a short circuit of internal electrodes.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Configuration of Multi-layer Ceramic Capacitor 10

Figure 1:
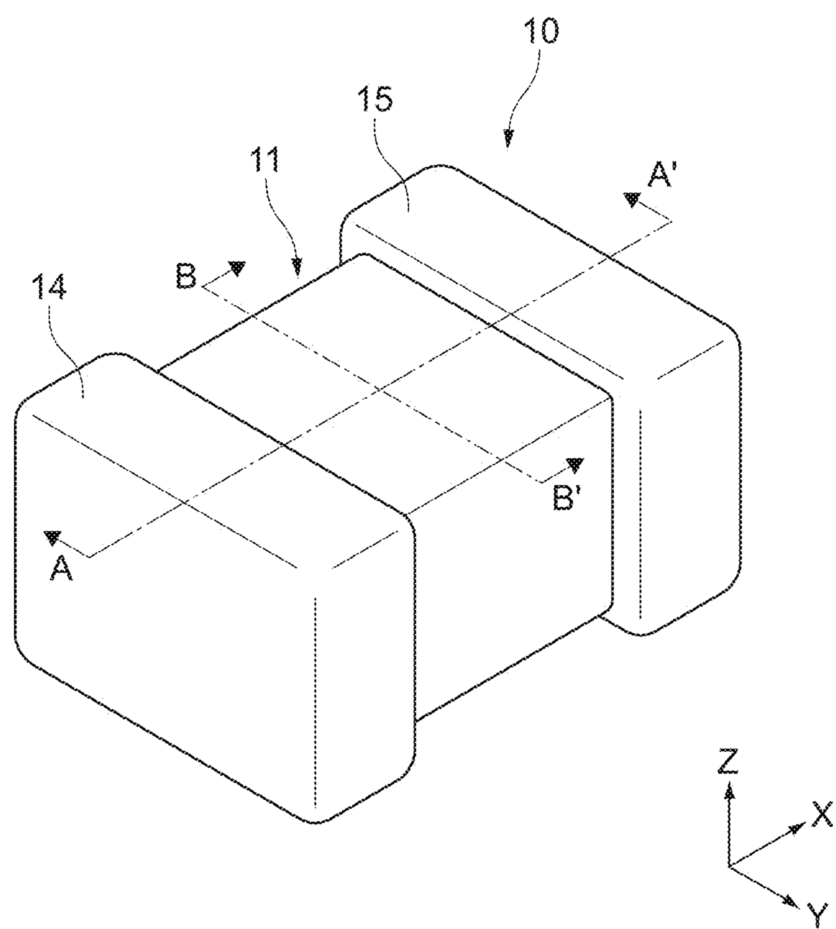
FIG. 1 is a perspective view of a multi-layer ceramic capacitor according to an embodiment of the present disclosure.
Figure 2:
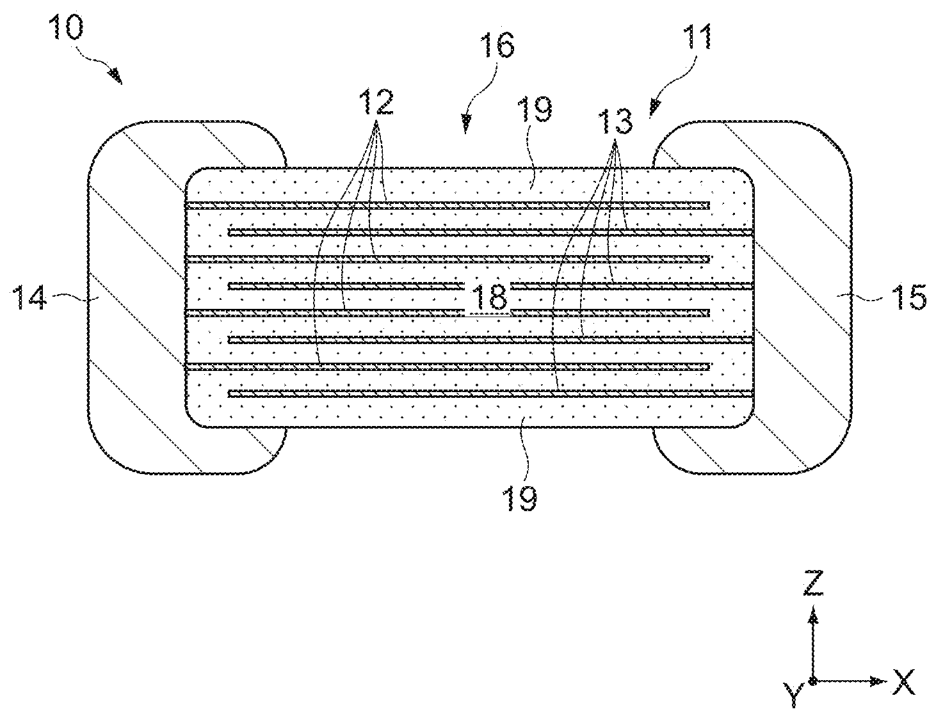
FIG. 2 is a cross-sectional view of the multi-layer ceramic capacitor taken along the A-A' line in FIG. 1.
Figure 3:
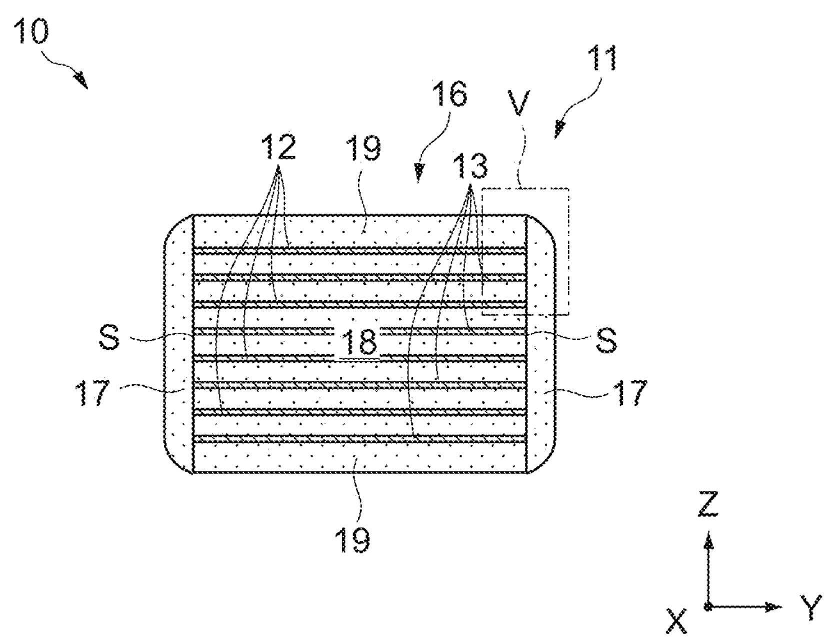
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 is typically formed to have a large size. In the large multi-layer ceramic capacitor 10, for example, a dimension in the X-axis direction can be set to approximately 1.6 to 5.7 mm, and dimensions in the Y- and Z-axis directions can be set to approximately 0.8 to 5.0 mm. Further, a capacitance of the multi-layer ceramic capacitor 10 is typically set to approximately 100 to 1,000 μF.

The large multi-layer ceramic capacitor 10 can be widely used for use applications in which a large capacitance is necessary, and typically for use applications in which an electrolytic capacitor is used. As an example, the multi-layer ceramic capacitor 10 can be used in place of an electrolytic capacitor that is widely used for stationary devices for mobile communications.

The multi-layer ceramic capacitor 10 includes a ceramic body 11, a first external electrode 14, and a second external electrode 15. Typically, the ceramic body 11 is formed as a hexahedron having two end surfaces facing in an X-axis direction, two side surfaces facing in a Y-axis direction, and two main surfaces facing in a Z-axis direction.

The first external electrode 14 and the second external electrode 15 cover the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, both of the first external electrode 14 and the second external electrode 15 have U-shaped cross sections parallel to the X-Z plane and the X-Y plane.

It should be noted that the shapes of the first external electrode 14 and the second external electrode 15 are not limited to those shown in FIG. 1. For example, the first external electrode 14 and the second external electrode 15 may extend to one of the main surfaces from the end surfaces of the ceramic body 11 and have L-shaped cross sections parallel to the X-Z plane. Further, the first external electrode 14 and the second external electrode 15 may not extend to any of the main surfaces and the side surfaces.

The first and second external electrodes 14 and 15 are each formed of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is formed of dielectric ceramics and includes a multi-layer chip 16 and side margins 17. The multi-layer unit 16 has two end surfaces facing in the X-axis direction, two side surfaces S facing in the Y-axis direction, and two main surfaces facing in the Z-axis direction. The side margins 17 cover the two side surfaces S of the multi-layer unit 16.

The multi-layer chip 16 has a configuration in which a plurality of flat plate-like ceramic layers extending along the X-Y plane are laminated in the Z-axis direction. The multi-layer chip 16 includes a capacitance forming unit 18 and covers 19. The covers 19 cover the capacitance forming unit 18 in the Z-axis direction from above and below and form the two main surfaces of the multi-layer unit 16.

The capacitance forming unit 18 includes a plurality of first internal electrodes 12 and a plurality of second internal electrodes 13 that are disposed between the plurality of ceramic layers. The first and second internal electrodes 12 and 13 each have a sheet-like shape extending along the X-Y plane. The first and second internal electrodes 12 and 13 are alternately disposed in the Z-axis direction. In other words, the first and second internal electrodes 12 and 13 face each other in the Z-axis direction while sandwiching the ceramic layers therebetween.

The first and second internal electrodes 12 and 13 are formed over the entire width of the capacitance forming unit 18 in the Y-axis direction and are exposed on both the side surfaces S of the multi-layer unit 16. In the ceramic body 11, the first and second internal electrodes 12 and 13 exposed on both the side surfaces S of the multi-layer unit 16 can be suitably protected by the side margins 17 that cover both the side surfaces S of the multi-layer unit 16.

The first internal electrodes 12 are drawn to only one of the end surfaces of the ceramic body 11. The second internal electrodes 13 are drawn to only the other end surface of the ceramic body 11. With this configuration, the first internal electrodes 12 are connected to only the first external electrode 14, and the second internal electrodes 13 are connected to only the second external electrode 15.

With such a condiguration, when a voltage is applied between the first external electrode 14 and the second external electrode 15 in the multi-layer ceramic capacitor 10, the voltage is applied to the plurality of ceramic layers between the first internal electrodes 12 and the second internal electrodes 13. Accordingly, the multi-layer ceramic capacitor 10 stores charge corresponding to the voltage applied between the first external electrode 14 and the second external electrode 15.

In the ceramic body 11, in order to increase capacitances of the ceramic layers provided between the first internal electrodes 12 and the second internal electrodes 13, dielectric ceramics having a high dielectric constant is used. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layer may have a composition such as strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

Figure 4:
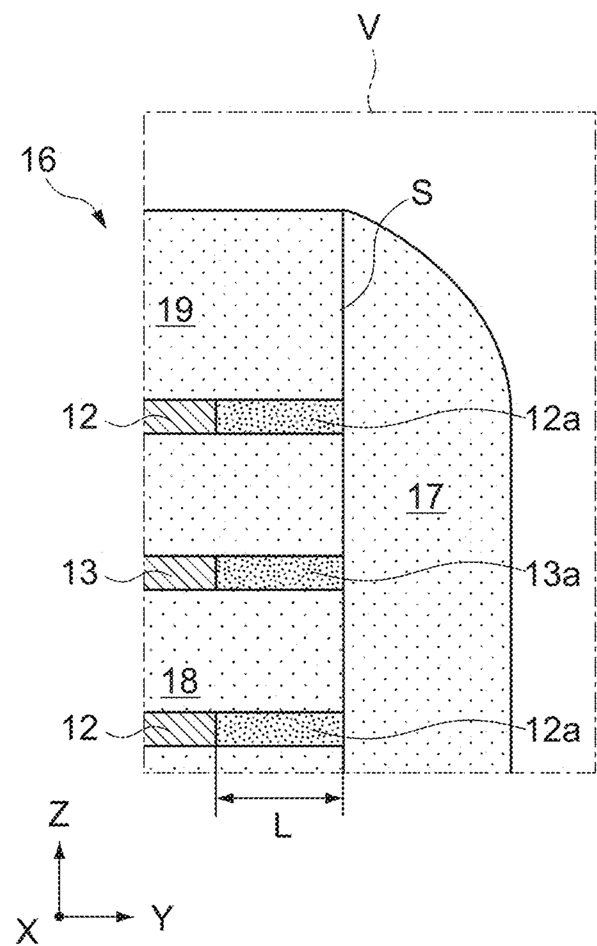
FIG. 4 is a partially enlarged cross-sectional view of a region V of the multi-layer ceramic capacitor shown in FIG. 3.

FIG. 4 is a partially enlarged cross-sectional view of a region V of the multi-layer ceramic capacitor 10, which is surrounded by a chain line of FIG. 3. FIG. 4 shows end portions of the first and second internal electrodes 12 and 13 in the Y-axis direction. The first and second internal electrodes 12 and 13 include oxidized regions 12*a* and 13*a*, respectively, at both end portions thereof in the Y-axis direction. Those end portions are adjacent to the side surfaces S of the multi-layer unit 16.

The oxidized regions 12*a* and 13*a* are each formed of an oxide containing a metal element forming the first and second internal electrodes 12 and 13. Thus, the oxidized regions 12*a* and 13*a* have insulation properties. Accordingly, in the multi-layer ceramic capacitor 10, a short circuit of the first and second internal electrodes 12 and 13 can be inhibited from occurring in the side surfaces S of the multi-layer unit 16 and in the vicinity thereof.

The oxidized regions 12*a* and 13*a* having insulation properties do not contribute to the formation of capacitance. Thus, as a dimension L of each of the oxidized regions 12*a* and 13*a* in the Y-axis direction becomes larger, the capacitance of the multi-layer ceramic capacitor 10 becomes lower. However, in a large multi-layer ceramic capacitor 10 having a large capacitance, reduction in capacitance due to the oxidized regions 12*a* and 13*a* can be considered to be an error range.

Thus, in the large multi-layer ceramic capacitor 10, the dimension L of each of the oxidized regions 12*a* and 13*a* is increased within a range capable of ensuring a necessary capacitance, and thus a short circuit of the first and second internal electrodes 12 and 13 can be more reliably inhibited from occurring. From this perspective, the dimension L of each of the oxidized regions 12*a* and 13*a* is favorably set to 10 μm or more.

It should be noted that FIGS. 2 and 3 each show eight layers of the first and second internal electrodes 12 and 13 in total, which is much smaller than the actual number of laminated layers, for the purpose of facilitating visualization of the laminated structure. However, in the large multi-layer ceramic capacitor 10, it is favorable that the total number of first and second internal electrodes 12 and 13 to be laminated is 500 layers or more in order to obtain a large capacitance.

Further, the basic configuration of the multi-layer ceramic capacitor 10 according to this embodiment is not limited to that shown in FIGS. 1 to 3 and can be changed as appropriate. For example, the shapes of the ceramic body 11 and the first and second external electrodes 14 and 15 can be determined as appropriate according to the size and performance expected for the multi-layer ceramic capacitor 10.

2. Method of Producing Multi-layer Ceramic Capacitor 10

Figure 5:
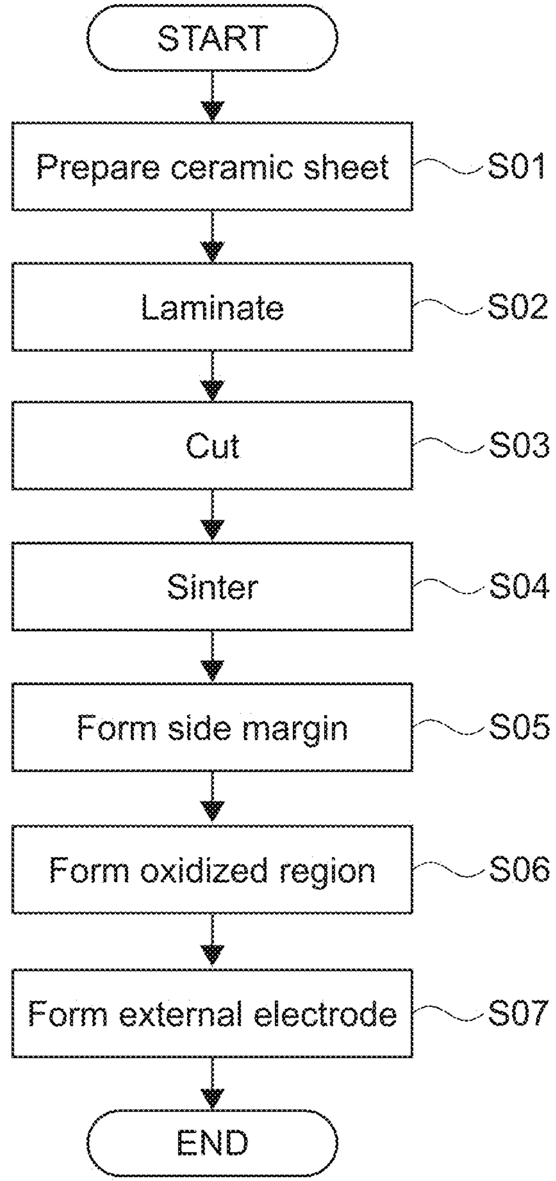
FIG. 5 is a flowchart showing a method of producing the multi-layer ceramic capacitor.

FIG. 5 is a flowchart showing a method of producing the multi-layer ceramic capacitor 10 according to this embodiment. FIGS. 6A to 12 are views each schematically showing a production process of the multi-layer ceramic capacitor 10. Hereinafter, the method of producing the multi-layer ceramic capacitor 10 will be described according to FIG. 5 with reference to FIGS. 6A to 12 as appropriate.

2.1 Step S01: Preparation of Ceramic Sheet

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 are formed as unsintered dielectric green sheets mainly containing dielectric ceramics.

The first, second, and third ceramic sheets 101, 102, and 103 are formed into sheets by using a roll coater or a doctor blade, for example. The thickness of each of the first and second ceramic sheets 101 and 102 is adjusted according to the thickness of each ceramic layer in the capacitance forming unit 18 to be obtained after sintering. The thickness of the third ceramic sheet 103 can be adjusted as appropriate.

Figures 6A, 6B, 6C:
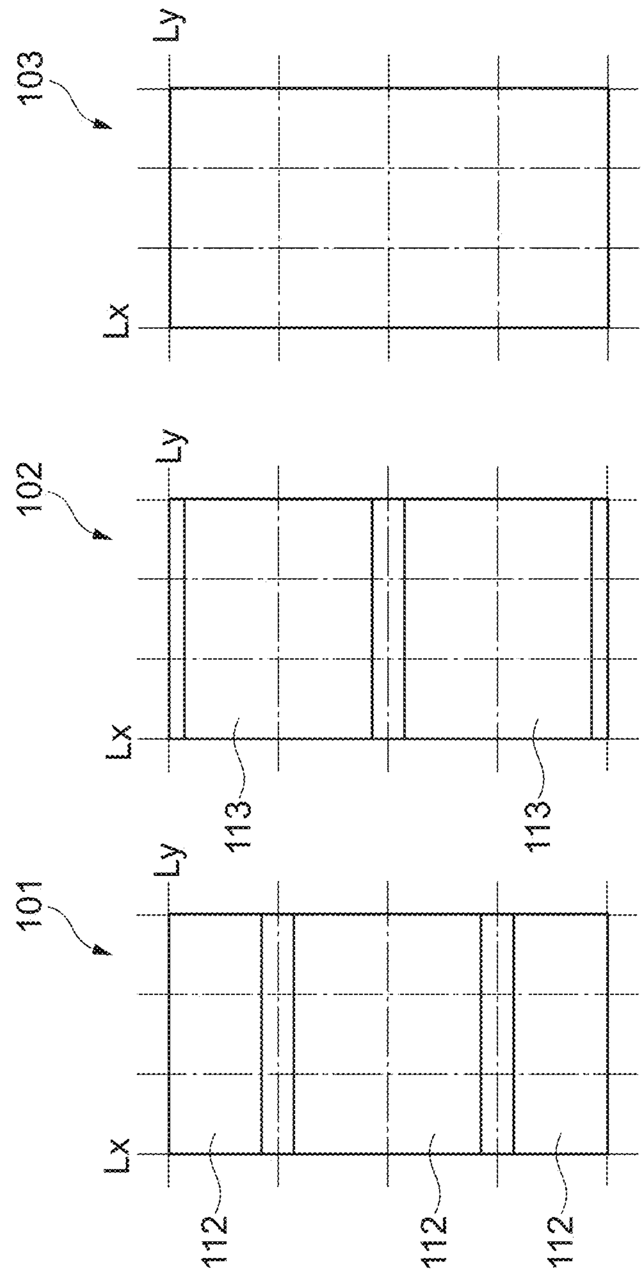
FIGS. 6A, 6B, and 6C are each a plan view of a multi-layer sheet prepared in Step S01 of the production method described above.

FIGS. 6A, 6B, and 6C are plan views of the first, second, and third ceramic sheets 101, 102, and 103, respectively. At this stage, the first, second, and third ceramic sheets 101, 102, and 103 are not singulated. FIGS. 6A, 6B, and 6C each show cutting lines Lx and Ly to be used when the sheets are singulated into the multi-layer ceramic capacitors 10. The cutting lines Lx are parallel to the X axis, and the cutting lines Ly are parallel to the Y axis.

As shown in FIGS. 6A, 6B, and 6C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first and second internal electrodes 112 and 113 can be formed by applying an optional electrically conductive paste to the first and second ceramic sheets 101 and 102 to have a thickness corresponding to that of the first and second internal electrodes 12 and 13 of the capacitance forming unit 18 to be obtained after sintering. For the method of applying an electrically conductive paste, for example, a screen printing method or a gravure printing method can be used.

In the first and second internal electrodes 112 and 113, gaps are disposed in the X-axis direction along the cutting lines Ly for every other cutting line Ly. The gaps of the first internal electrodes 112 and the gaps of the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

2.2 Step S02: Lamination

Figure 7:
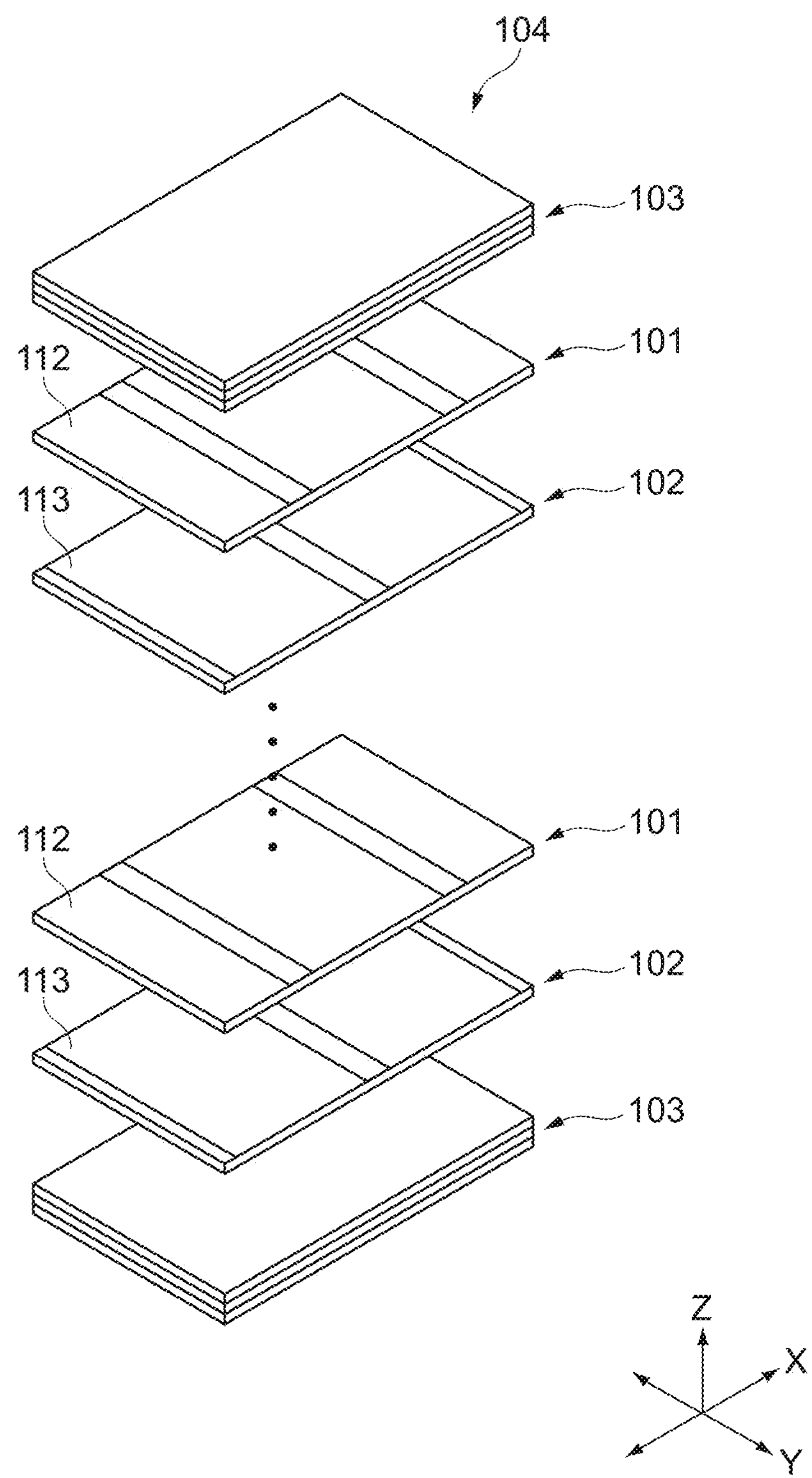
FIG. 7 is a perspective view of the multi-layer sheet in Step S02 of the production method described above.

In Step S02, the first, second, and third ceramic sheets 101, 102, and 103 prepared in Step S01 are laminated as shown in FIG. 7, to produce a multi-layer sheet 104. In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the uppermost and lowermost surfaces of the alternately laminated first and second ceramic sheets 101 and 102 in the Z-axis direction. It should be noted that in the example shown in FIG. 7 three third ceramic sheets 103 are laminated on each of the uppermost and lowermost surfaces of the laminated first and second ceramic sheets 101 and 102, but the number of third ceramic sheets 103 can be changed as appropriate.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is favorably used. This makes it possible to obtain a high-density multi-layer sheet 104.

2.3 Step S03: Cutting

Figure 8:
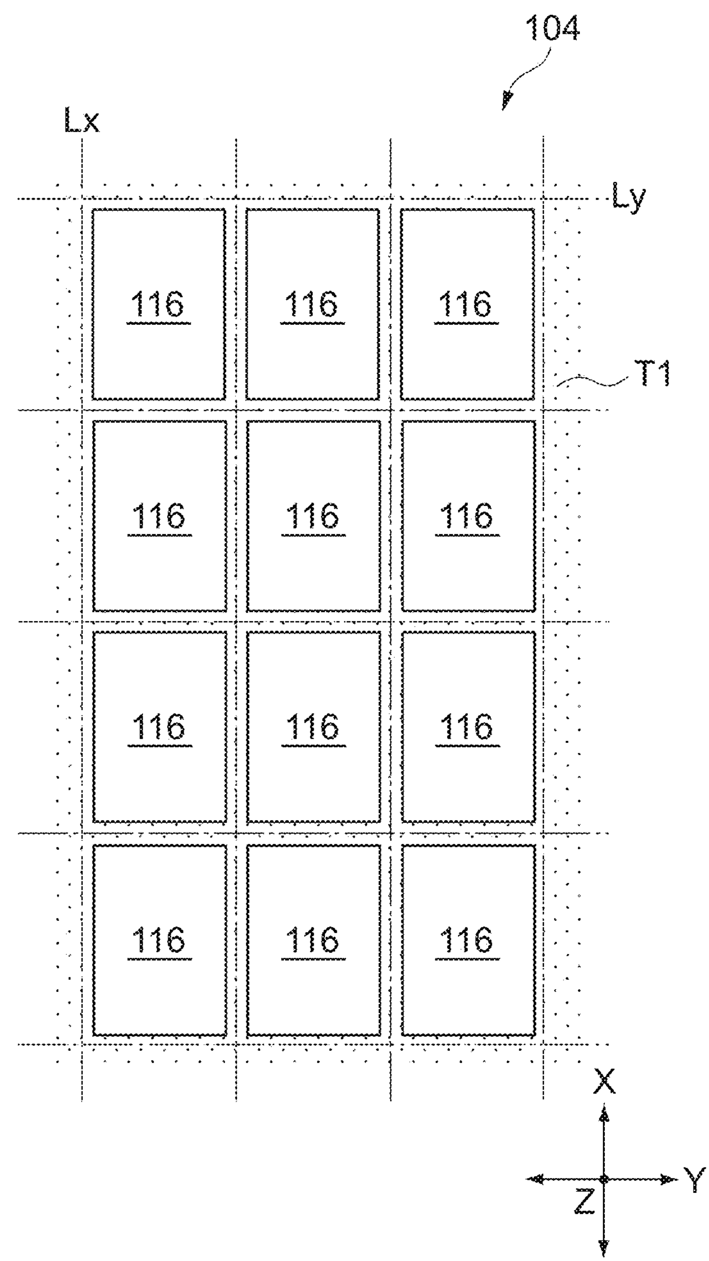
FIG. 8 is a plan view of the multi-layer sheet in Step S03 of the production method described above.

In Step S03, the multi-layer sheet 104 obtained in Step S02 is cut along the cutting lines Lx and Ly while being fixed to a tape T1 as shown in FIG. 8, to produce unsintered multi-layer units 116. Each of the multi-layer units 116 corresponds to a multi-layer unit 16 to be obtained after sintering. The multi-layer sheet 104 can be cut with a push-cutting blade, a rotary blade, or the like.

Figure 9A:
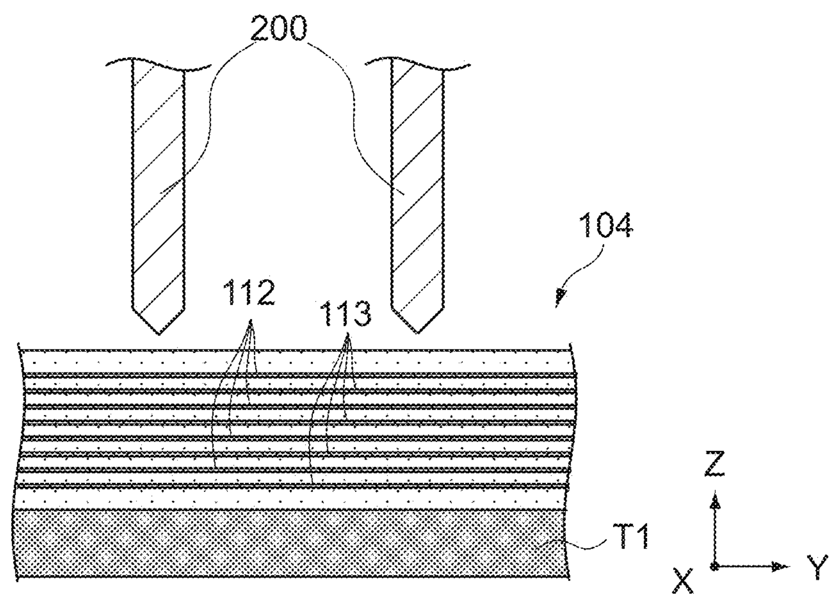
FIGS. 9A, 9B, and 9C are each a cross-sectional view of the multi-layer sheet in Step S03 of the production method described above.
Figure 9B:
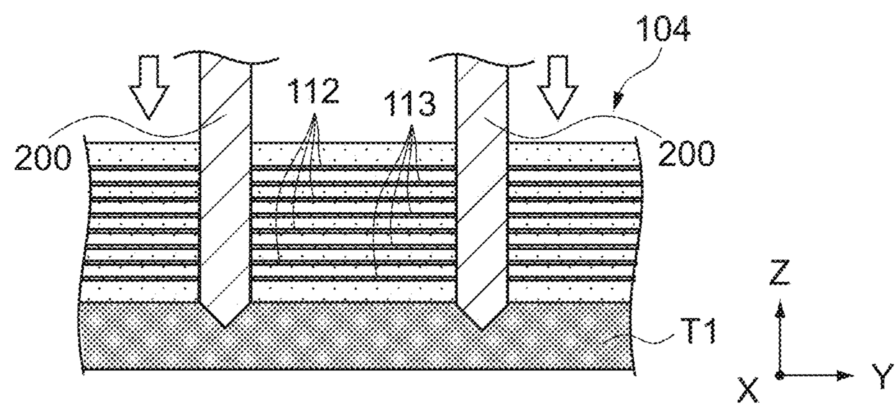
Figure 9C:
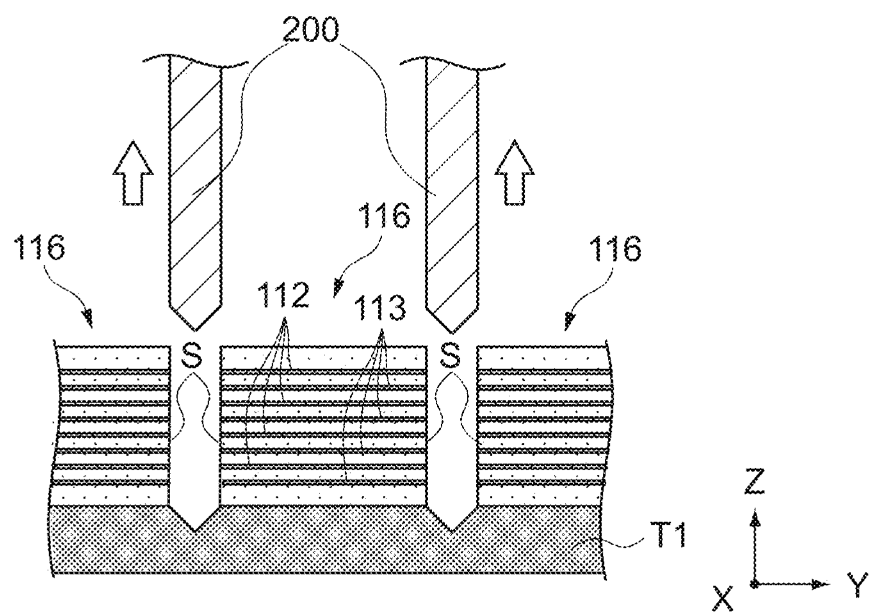

FIGS. 9A, 9B, and 9C are cross-sectional views showing a process of cutting the multi-layer sheet 104 with a cutting device including a push-cutting blade 200. As shown in FIG. 9A, the push-cutting blade 200 is disposed on the upper side of the multi-layer sheet 104 in the Z-axis direction, the multi-layer sheet 104 being fixed to the tape T1, with the tip of the push-cutting blade 200 facing downward in the Z-axis direction.

From the state shown in FIG. 9A, the push-cutting blade 200 is moved downward in the Z-axis direction until the tip of the push-cutting blade 200 reaches the tape T1 as shown in FIG. 9B, and thus the multi-layer sheet 104 is cut. Subsequently, as shown in FIG. 9C, the push-cutting blade 200 is moved upward in the Z-axis direction and pulled out of the multi-layer sheet 104.

Figure 10A:
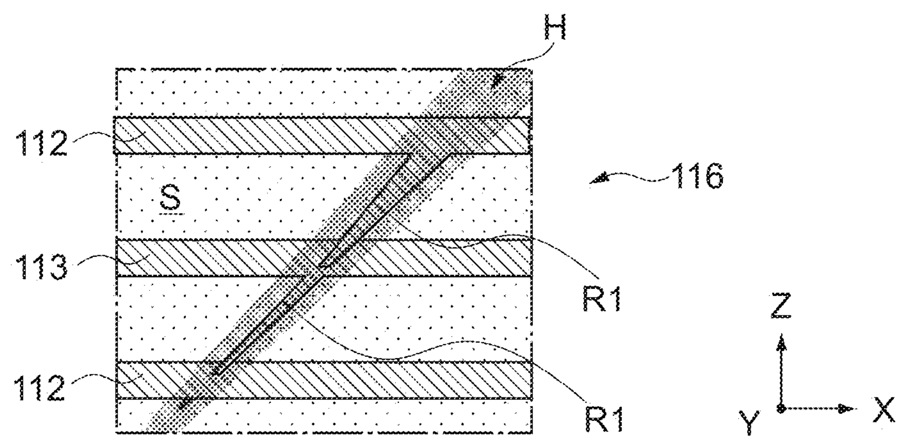
FIGS. 10A, 10B, and 10C are each a cross-sectional view illustrating by an example a state of a side surface of the multi-layer unit obtained after Step S03 of the production method described above.
Figure 10B:
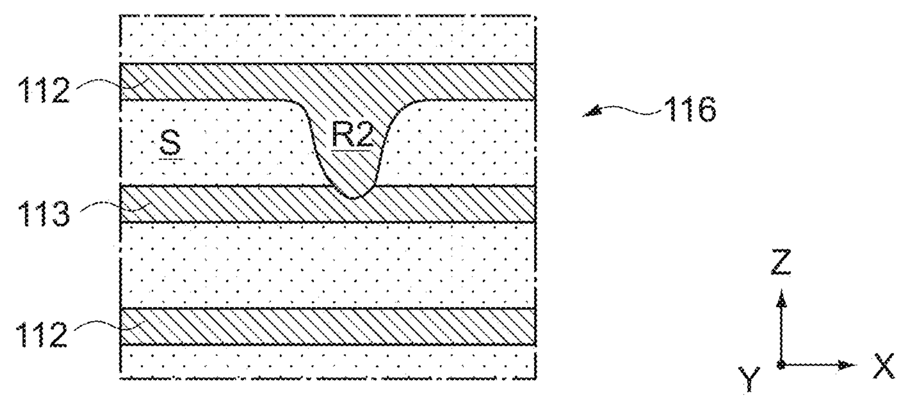
Figure 10C:
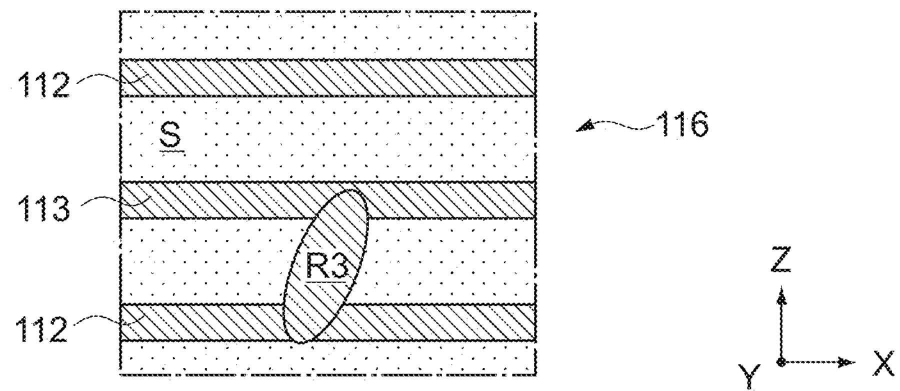

Accordingly, the multi-layer sheet 104 is singulated into a plurality of multi-layer units 116. The cut surfaces of the multi-layer sheet 104 along the X-axis direction become side surfaces S of each multi-layer unit 116 that face in the Y-axis direction. FIGS. 10A, 10B, and 10C are each an enlarged cross-sectional view illustrating by an example a state of the side surface S of the multi-layer unit 116 obtained immediately after the singualtion of Step S03.

In the side surface S of the multi-layer unit 116 shown in FIG. 10A, a scratch H is formed due to, for example, entry of foreign substances by the push-cutting blade 200. When the push-cutting blade 200 drags the first and second internal electrodes 112 and 113 along the side surface S of the multi-layer unit 116 in the course of formation of the scratch H, the first and second internal electrodes 112 and 113 are stretched along the scratch H. Thus, a stretched portion R1 is formed.

In the side surface S of the multi-layer unit 116 shown in FIG. 10B, the scratch H as shown in FIG. 10A is not formed. However, also in this case, when the push-cutting blade 200 drags the first and second internal electrodes 112 and 113 along the side surface S of the multi-layer unit 116, the first and second internal electrodes 112 and 113 are stretched along the side surface S. Thus, a stretched portion R2 is formed.

In the side surface S of the multi-layer unit 116 shown in FIG. 10C, a foreign substance R3 having electrical conductivity is attached. Examples of the foreign substance R3 assumed to adhere to the side surface S of the multi-layer unit 116 in Step S03 include a metallic foreign substance generated due to the first and second internal electrodes 112 and 113, the push-cutting blade 200, or the like in the course of cutting.

When the stretched portion R1 or R2 reaches one of the first and second internal electrodes 112 and 113 from the other one or when the foreign substance R3 adhere to both of the first and second internal electrodes 112 and 113, the first and second internal electrodes 112 and 113 are connected to each other via the stretched portion R1 or R2 or the foreign substance R3. In such a manner, in the side surface S of the multi-layer unit 116, a short circuit of the first and second internal electrodes 112 and 113 may occur.

In this embodiment, even if a short circuit of the first and second internal electrodes 112 and 113 is occurring in the side surface S of the multi-layer unit 116 at the stage of Step S03, the short circuit can be eliminated in Step S06 (formation of oxidized region) to be described later. Thus, in Step S03, it is unnecessary to eliminate the short circuit of the first and second internal electrodes 112 and 113 in the side surface S of the multi-layer unit 116.

2.4 Step S04: Sintering

In Step S04, the unsintered multi-layer unit 116 obtained in Step S03 is sintered. Accordingly, the multi-layer unit 16 is obtained. A sintering temperature for the multi-layer unit 116 can be set to approximately 1,000 to 1,300° C., for example, when a barium titanate based material is used. Sintering can be performed in a reduction atmosphere or a low-oxygen partial pressure atmosphere, for example.

In such a manner, in this embodiment, the multi-layer unit 116 is sintered before the side margins 117 are formed in Step S05 to be described later. This allows a solvent or a binder contained in the unsintered multi-layer unit 116 to be suitably removed from the side surfaces S. Therefore, in this embodiment, it is possible to produce a multi-layer ceramic capacitor 10 with a stable quality.

2.5 Step 505: Formation of Side Margin

In Step 505, the side margins 17 are provided to the side surfaces S of the multi-layer unit 16 sintered in Step S04, to produce a ceramic body 11. Specifically, in Step 505, the unsintered side margins 117 are provided to the side surfaces S of the multi-layer unit 16 by a dip method and then baked onto the surfaces S of the multi-layer unit 16.

Figure 11A:
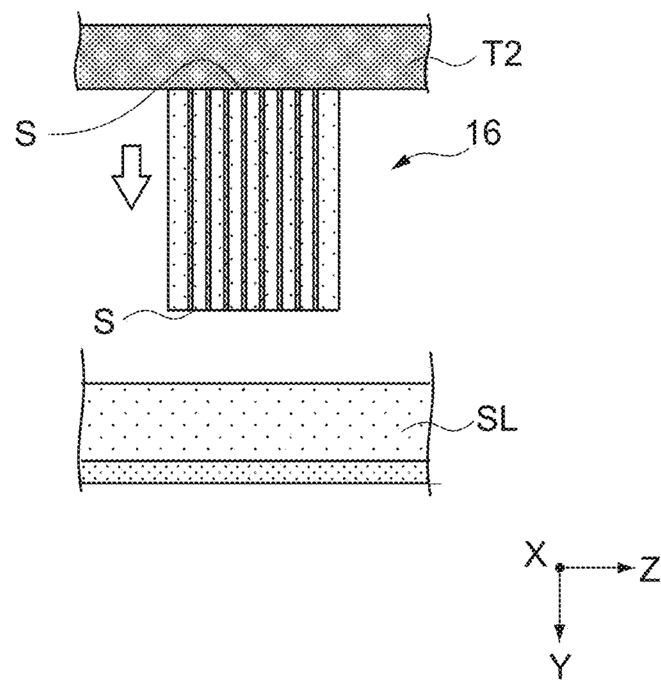
FIGS. 11A and 11B are each a cross-sectional view of the multi-layer unit in Step S05 of the production method described above.

More specifically, first, as shown in FIG. 11A, ceramic slurry SL housed in a container is prepared, and one side surface S of the multi-layer unit 16, the other side surface S of which is held with a tape T2, is caused to face the ceramic slurry SL. The thickness of the side margin 117 is adjustable by the contained amount of a solvent or a binder in the ceramic slurry SL.

Figure 11B:
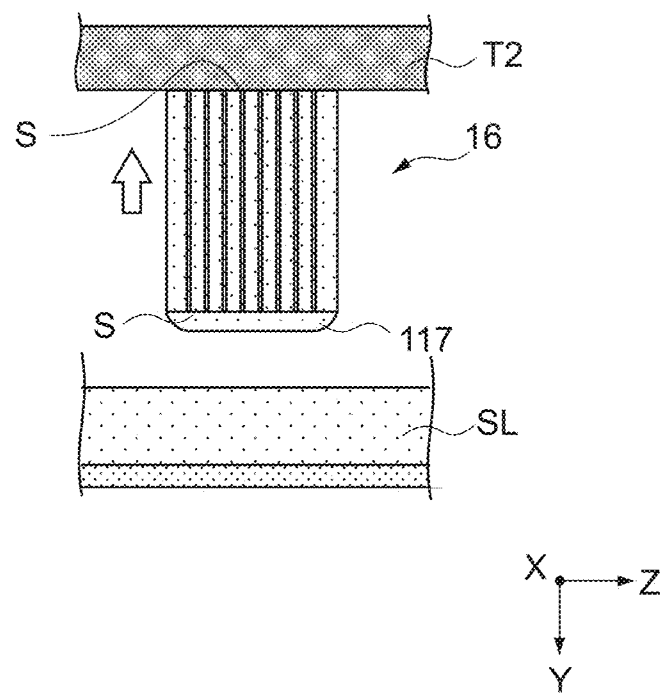

Next, the multi-layer unit 16 shown in FIG. 11A is moved downward and then the side surface S of the multi-layer unit 16 is immersed into the ceramic slurry SL. Subsequently, as shown in FIG. 11B, the multi-layer unit 16 is pulled up in a state where the ceramic slurry SL is adhering to the surface S. Thus, the side margin 117 is formed on the surface S of the multi-layer unit 16.

Subsequently, the orientation of the side surface S of the multi-layer unit 16 in the Y-axis direction is inverted by transferring the multi-layer unit 16 to a tape different from the tape T2 shown in FIG. 11B. In the manner similar to the above, the unsintered side margin 117 is formed also on the side surface S on the other side of the multi-layer unit 16, on which the side margin 117 is not formed.

The multi-layer unit 16 having the surfaces S on which the unsintered side margins 117 are formed is then re-sintered. Accordingly, the side margins 117 are sintered to become the side margins 17 and are simultaneously baked onto the surfaces S of the multi-layer unit 16. Accordingly, the ceramic body 11 including the side margins 17 is obtained.

In general, in a method of simultaneously sintering the multi-layer unit 116 and the side margins 117 after providing the side margins 117 to the multi-layer unit 116, stress is applied to the side surfaces S of the multi-layer unit 116 by a difference in shrinkage behavior between the multi-layer unit 116 and each side margin 117. Accordingly, a short circuit due to the deformation of the first and second internal electrodes 112 and 113 is likely to occur.

The difference in shrinkage behavior between the multi-layer unit 116 and the side margin 117 at the time of sintering is likely to increase in the Z-axis direction. Thus, a short circuit is likely to occur in a multi-layer ceramic capacitor 10 whose dimension in the Z-axis direction is 0.8 mm or more, and more likely to occur in a multi-layer ceramic capacitor 10 whose dimension in the Z-axis direction is 1.25 mm or more.

Specifically, a short circuit is likely to occur in a multi-layer ceramic capacitor 10 having a 1608-size (1.6 mm×0.8 mm×0.8 mm) or larger and is more likely to occur in a multi-layer ceramic capacitor 10 having a 2012-size (2.0 mm×1.25 mm×1.25 mm) or larger.

In contrast to this, in this embodiment, in Step 505, the side margins 17 are formed on the multi-layer unit 16 sintered in advance in Step S04. In other words, the multi-layer unit 16 and the side margins 17 are sintered at different stages. Therefore, in this embodiment, the difference in shrinkage behavior between the multi-layer unit 16 and each side margin 17 does not present a problem.

Thus, in this embodiment, even in a large multi-layer ceramic capacitor 10 having a 1608-size or larger or in a large multi-layer ceramic capacitor 10 having a 2012-size or larger, the first and second internal electrodes 112 and 113 in the vicinity of the side surfaces S of the multi-layer unit 16 are less likely to be deformed. Accordingly, a short circuit can be inhibited from occurring in the side surfaces S of the multi-layer unit 16 and in the vicinity thereof.

It should be noted that at the time of baking the side margins 117 in this embodiment, stress caused by the shrinkage of the side margins 117 is applied to the side surfaces S of the multi-layer unit 16. However, since the side margins 117 formed by dipping into the ceramic slurry SL have flexibility, the stress to be applied to the side surfaces S of the multi-layer unit 16 is suppressed.

It should be noted that the method of providing the unsintered side margins 117 to the side surfaces S of the multi-layer unit 16 is not limited to the dip method. For example, a ceramic sheet may be used instead of the ceramic slurry SL. In this case, the ceramic sheet may be punched out by the side surface S of the multi-layer unit 16, and then the side margin 117 may be formed on the side surface S of the multi-layer unit 16.

2.6 Step S06: Formation of Oxidized Region

Figure 12:
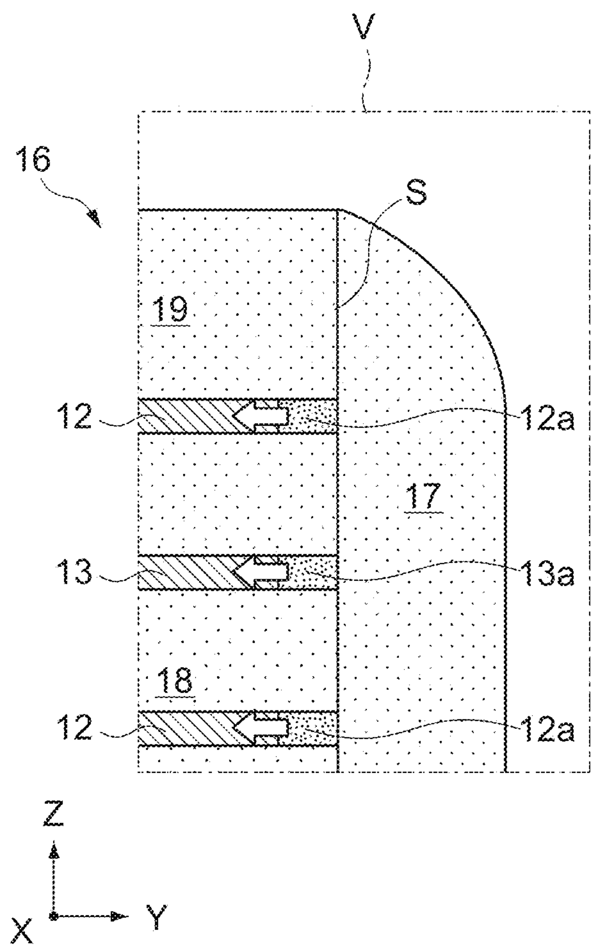
FIG. 12 is a partial cross-sectional view of the multi-layer unit in Step S06 of the production method described above.

In Step S06, the oxidized regions 12*a* and 13*a* are respectively formed in the first and second internal electrodes 12 and 13 of the ceramic body 11 on which the side margins 17 are formed in Step S05. More specifically, as shown in FIG. 12, the oxidation of the first and second internal electrodes 12 and 13 is caused to progress from the side surface S of the multi-layer unit 16, and the oxidized regions 12*a* and 13*a* are then formed.

In Step S06, even if the first and second internal electrodes 12 and 13 are short-circuited in the side surface S of the multi-layer unit 16 due to the stretched portions R1 and R2, the foreign substance R3, and the like shown in FIG. 10, the stretched portions R1 and R2 and the foreign substance R3 are also oxidized together with the first and second internal electrodes 12 and 13. Accordingly, the short circuit of the first and second internal electrodes 12 and 13 in the side surface S of the multi-layer unit 16 can be eliminated.

The method of forming the oxidized regions 12*a* and 13*a* in Step S06 only needs to allow the oxidation of the first and second internal electrodes 12 and 13 to progress from the side surfaces S of the multi-layer unit 16 covered with the side margins 17, and is not limited to a specific configuration. Typically, a configuration to perform heat treatment on the ceramic body 11 while supplying oxygen to the side surfaces S of the multi-layer unit 16 can be employed.

For example, it is effective to add an additive for accelerating the oxidation of the first and second internal electrodes 12 and 13 to the side margins 17. In this case, when heat treatment is performed on the ceramic body 11, the oxidation of the first and second internal electrodes 12 and 13 progresses along with the diffusion of the additive from the side surfaces S of the multi-layer unit 16, and the oxidized regions 12*a* and 13*a* are thus formed.

As an example, in a case where the first and second internal electrodes 12 and 13 are formed of nickel, magnesium can be added to the side margins 17 as an additive for accelerating the oxidation of nickel. Accordingly, in the first and second internal electrodes 12 and 13, oxidized regions 12*a* and 13*a* formed of an oxide containing nickel and magnesium are formed.

In such a method using an additive, the dimension L of each of the oxidized regions 12*a* and 13*a* can be controlled based on a time period or temperature of the heat treatment performed on the ceramic body 11, the additive amount of an additive to the side margins 17, or the like. Accordingly, the dimension L of each of the oxidized regions 12*a* and 13*a* can be adjusted to 10 μm or more.

In general, in the multi-layer unit 16 obtained before the side margins 17 are formed, the dimension L of each of the oxidized regions 12*a* and 13*a* is difficult to control. In other words, if oxygen is intended to be supplied from the exposed side surfaces S of the multi-layer unit 16, the oxidation of the first and second internal electrodes 12 and 13 rapidly progresses in a wide range. This makes it difficult to set the dimension L of each of the oxidized regions 12*a* and 13*a* to an appropriate value.

In this regard, in this embodiment, the side surfaces S of the multi-layer unit 16 are covered with the side margins 17 and the oxidized regions 12*a* and 13*a* are then formed, and thus the oxidation of the first and second internal electrodes 12 and 13 can be caused to moderately progress. Accordingly, the dimension L of each of the oxidized regions 12*a* and 13*a* can be more suitably controlled.

It should be noted that the heat treatment for forming the oxidized regions 12*a* and 13*a* in the first and second internal electrodes 12 and 13, respectively, may be performed before the side margins 117 are baked in Step S05. Accordingly, when the heat treatment is performed once, the baking of the side margins 117 and the formation of the oxidized regions 12*a* and 13*a* can be performed together.

2.7 Step S07: Formation of External Electrode

In Step S07, the first external electrode 14 and the second external electrode 15 are formed at both the end portions of the ceramic body 11 in the X-axis direction, in which the oxidized regions 12*a* and 13*a* are formed in Step S06, and the multi-layer ceramic capacitor 10 shown in FIGS. 1 and 3 is then produced. The method of forming the first external electrode 14 and the second external electrode 15 in Step S07 is optionally selectable from publicly known methods.

3. Example

For Example of the present disclosure, 100 samples for each of various types of multi-layer ceramic capacitors 10, which are different from one another in dimension L of each of the oxidized regions 12*a* and 13*a*, were produced. In each sample, the dimension in the X-axis direction was set to 20 the dimensions in the Y- and Z-axis directions were set to 12.5 μm, and a capacitance was set to 100 μF.

An electric resistance measurement was performed on the 100 samples for each of various types of multi-layer ceramic capacitors 10, which are different from one another in dimension L of each of the oxidized regions 12*a* and 13*a*, and the presence/absence of the occurrence of a short circuit was determined. Subsequently, a short circuit rate was calculated. The short circuit rate is a rate of samples in which a short circuit occurred out of the 100 samples having the same dimension L of each of the oxidized regions 12*a* and 13*a*.

Figure 13:
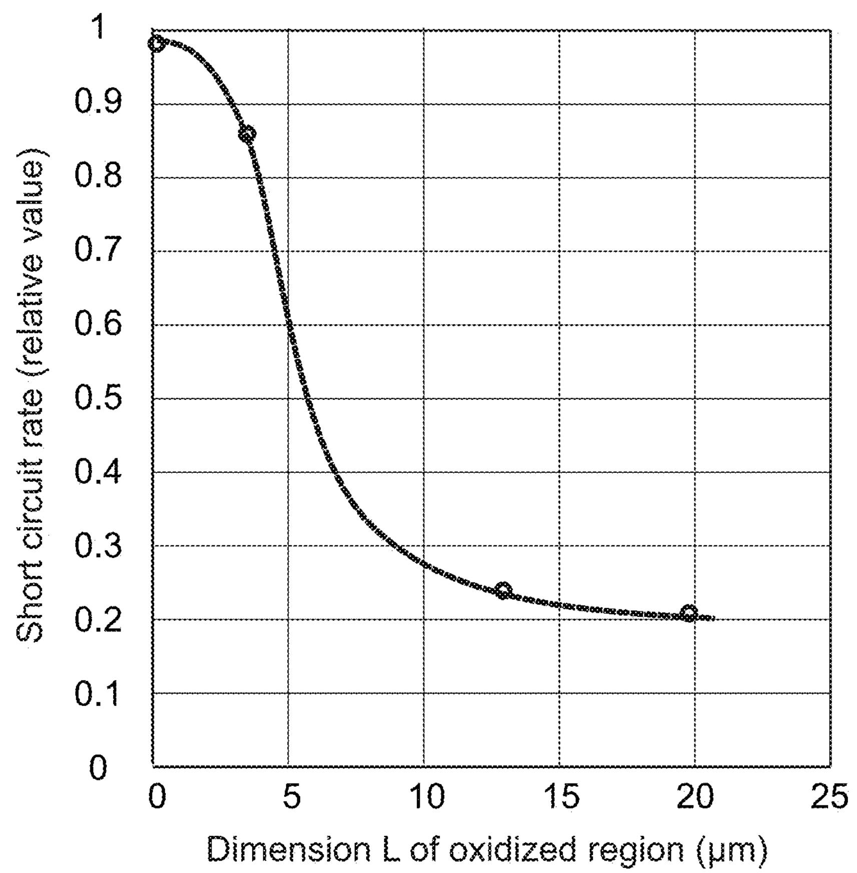
FIG. 13 is a graph showing a relationship between a dimension L of an oxidized region and a short circuit rate.

FIG. 13 is a graph showing a relationship between the dimension L of each of the oxidized regions 12*a* and 13*a* and the short circuit rate. FIG. 13 shows, as the short circuit rate, a relative value normalized when a short circuit rate of a sample, in which the oxidized regions 12*a* and 13*a* are not formed, that is, the dimension L of each of the oxidized regions 12*a* and 13*a* is zero, is 1.

With reference to FIG. 13, samples including the oxidized regions 12*a* and 13*a* had a lower short circuit rate than that of the samples in which the oxidized regions 12*a* and 13*a* were not formed, that is, the dimension L of each of the oxidized regions 12*a* and 13*a* was zero.

Further, samples having a larger dimension L of each of the oxidized regions 12*a* and 13*a* tended to have a lower short circuit rate. Furthermore, it was found that the change in short circuit rate is sharp in a region where the dimension L of each of the oxidized regions 12*a* and 13*a* is less than 10 whereas the change in short circuit rate is moderate in a region where the dimension L of each of the oxidized regions 12*a* and 13*a* is 10 μm or more.

Accordingly, it was confirmed that in the multi-layer ceramic capacitor 10, when the dimension L of each of the oxidized regions 12*a* and 13*a* is set to 10 μm or more, the occurrence of a short circuit can be more effectively suppressed. Further, even if the dimension L of each of the oxidized regions 12*a* and 13*a* is increased to be 10 μm or more, a great improvement in short circuit rate is not expected, and thus it is favorable to set the dimension L to be 20 μm or less.

4. Other Embodiments

Hereinabove, the embodiment of the present disclosure has been described, but the present disclosure is not limited to the embodiment described above and can be variously modified as a matter of course.

For example, in the embodiment described above, the multi-layer ceramic capacitor has been described as an example of a multi-layer ceramic electronic component, but the present disclosure can be applied to general multi-layer ceramic electronic components each including a pair of external electrodes. Examples of such multi-layer ceramic electronic components include a chip varistor, a chip thermistor, and a multi-layer inductor.

What is claimed is:

1. A method of producing a multi-layer ceramic electronic component, the method comprising:

laminating ceramic layers in a first direction and disposing internal electrodes between the ceramic layers to produce a multi-layer unit, wherein the multi-layer unit is produced having a side surface that faces a second direction orthogonal to the first direction;

exposing the internal electrodes on the side surface;

sintering the multi-layer unit having the internal electrodes exposed on the side surface thereof to form a sintered multi-layer unit;

after sintering the multi-layer unit, forming a side margin on the side surface of the sintered multi-layer unit; and forming an oxidized region at an end portion in the second direction of each of the internal electrodes of the multi-layer unit on which the side margin is formed.

2. The method of producing a multi-layer ceramic electronic component according to claim 1, wherein the oxidized region has a dimension of 10 μm or more in the second direction.

3. The method of producing a multi-layer ceramic electronic component according to claim 1, wherein laminating the ceramic layers and forming the side margin comprise laminating the ceramic layers and forming the side margin such that the multi-layer ceramic electronic component has a dimension of 0.8 mm or more in the first direction.

4. The method of producing a multi-layer ceramic electronic component according to claim 1, wherein the number of lamination of the internal electrodes is 500 layers or more.

5. The method of producing a multi-layer ceramic electronic component according to claim 1, wherein forming the side margin comprises forming the side margin by a dip method.

6. The method of producing a multi-layer ceramic electronic component according to claim 1, wherein laminating the ceramic layers, disposing the internal electrodes, and forming the side margin comprise laminating the ceramic layers, disposing the internal electrodes, and forming the side margin such that the multi-layer ceramic electronic component has a 1608-size or larger.

* * * * *